No. 891,754. PATENTED JUNE 23, 1908.
R. L. WASHINGTON.
DISH WARMER.
APPLICATION FILED JUNE 11, 1907.

2 SHEETS—SHEET 1.

Inventor
Rolland L. Washington

Witnesses
F. C. Gibson.

By Victor J. Evans.
Attorney

No. 891,754. PATENTED JUNE 23, 1908.
R. L. WASHINGTON.
DISH WARMER.
APPLICATION FILED JUNE 11, 1907.
2 SHEETS—SHEET 2.
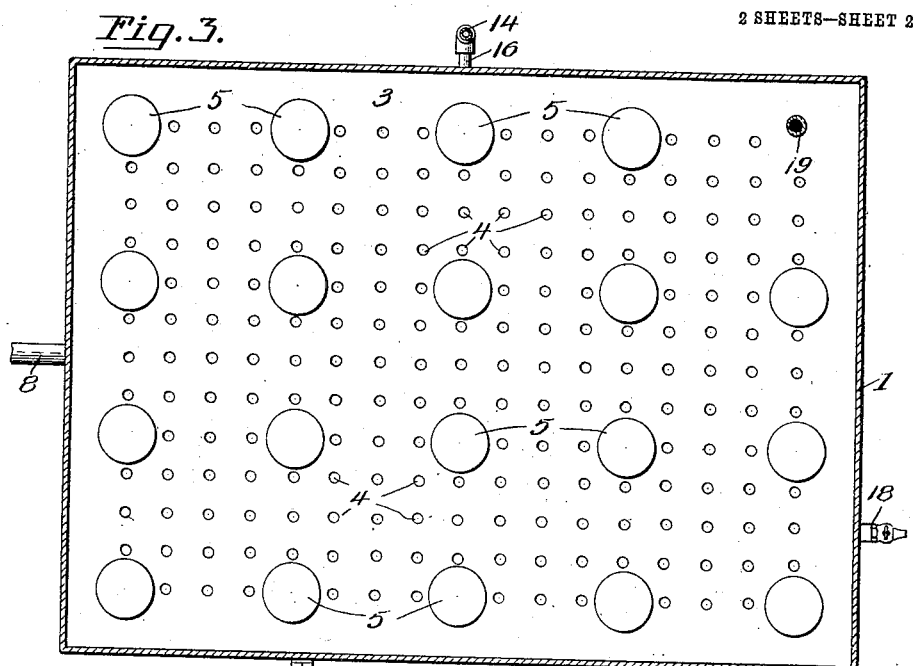
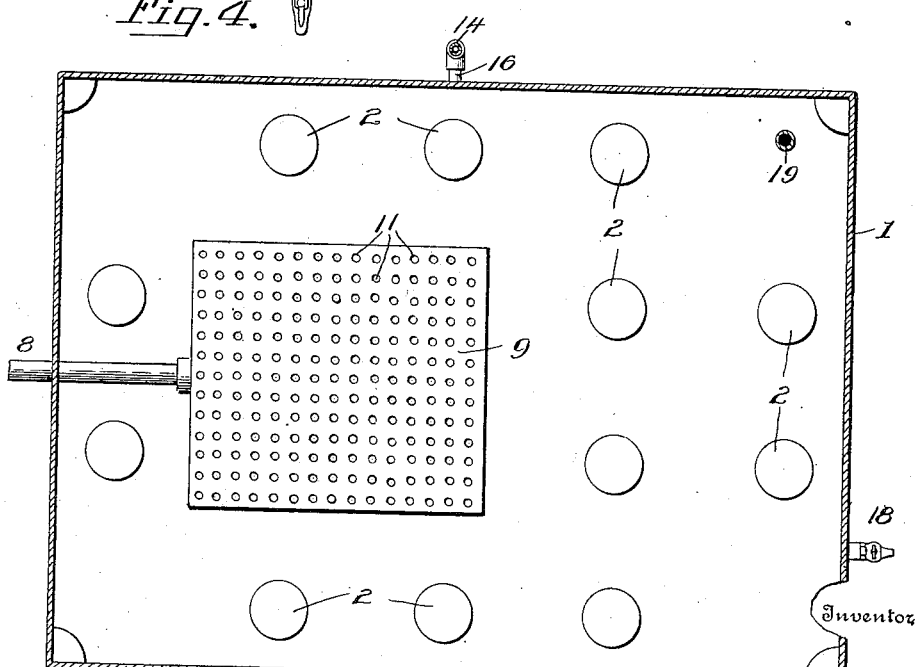

UNITED STATES PATENT OFFICE.

ROLLAND L. WASHINGTON, OF BOSTON, MASSACHUSETTS.

DISH-WARMER.

No. 891,754.  Specification of Letters Patent.  Patented June 23, 1908.

Application filed June 11, 1907. Serial No. 378,436.

*To all whom it may concern:*

Be it known that I, ROLLAND L. WASHINGTON, a citizen of the United States of America, residing at Boston, in the county of Suffolk and State of Massachusetts, have invented new and useful Improvements in Dish-Warmers, of which the following is a specification.

This invention relates to dish warmers, designed more particularly for use on railway dining cars, and one of the principal objects of the same is to provide a simple device for keeping dishes warm in railway dining cars, and to provide means for furnishing hot water whenever required.

Another object of the invention is to provide simple means for keeping dishes warm, for producing hot water at any time, and to provide convenient means for washing dishes whenever required, on railway dining cars.

It has been particularly inconvenient on dining cars as at present arranged to provide means keeping dishes hot in cold weather, and for providing a ready supply of hot water, owing principally to the fact that but little room is afforded for modern appliances for the purposes referred to.

My invention has for one of its principal objects to provide increased facilities for washing dishes in hot water, providing means for keeping dishes hot for service in the dining car, and to provide a ready supply of hot water whenever required.

Figure 1:
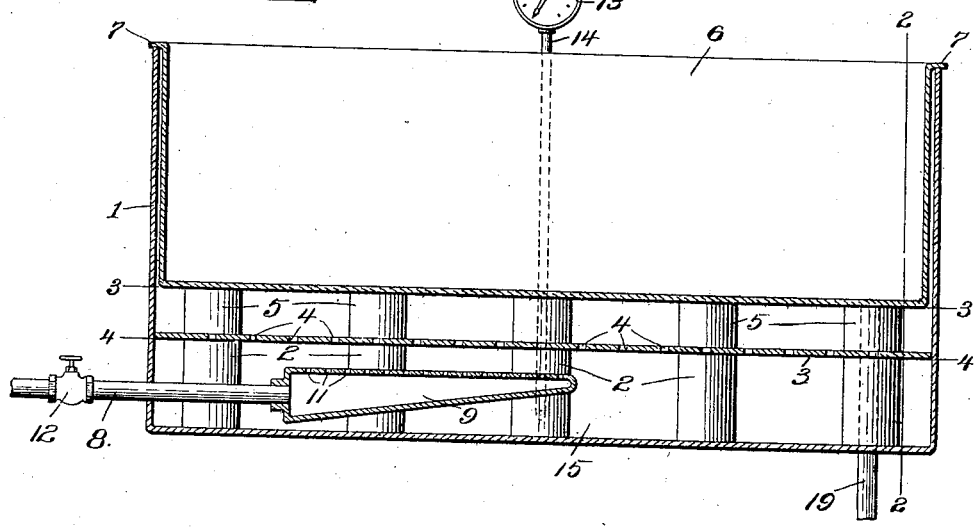
Figure 2:
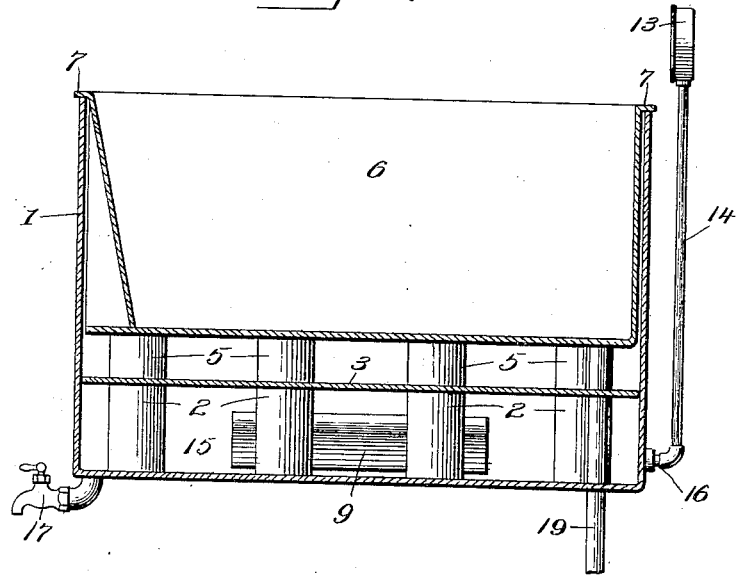

These and other objects may be attained by means of the construction illustrated in the accompanying drawings, in which:

Figure 1 is a central vertical section of a dish warmer made in accordance with my invention. Fig. 2 is a vertical sectional view on the line 2—2 of Fig. 1. Fig. 3 is a horizontal section on the line 3—3 of Fig. 1. Fig. 4 is a similar view on the line 4—4 of Fig. 1.

Referring to the drawings for a more particular description of my invention, the numeral 1 designates an outer casing made preferably of sheet metal in the form of a sink having closed bottom and sides and an open top. Properly supported upon the bottom of the casing 1 is a series of supports 2 upon which a perforated plate 3 is supported, said plate having a series of perforations 4 therein. The function of said perforated plate is to form a basis for the supports 5 upon which the heavy metal tray rests and also providing space below the perforated plate for the steam heater. Connected to the upper side of the plate 3 is a series of supports 5. A tray 6 is supported upon the supports 5 at the bottom thereof, and at the upper edge of the tray outwardly extending flanges 7 are provided which rest upon the upper edge of the casing 1, as shown more particularly in Figs. 1 and 2. A steam inlet pipe 8 extends through the casing 1 at a point below the plate 3, and upon the inner end of the pipe 8 a steam heater 9 is connected, said steam heater having its top portion 10 provided with a series of perforations 11. A suitable cock or valve 12 is provided in the steam inlet pipe 8. A steam gage 13 is supported upon the upper end of a gage pipe 14, the lower end of which communicates with the steam chamber 15, as at 16. A hot water spigot 17 communicates with the bottom of the casing 1 and may be used for drawing off the hot water of condensation whenever hot water is required. An exhaust cock 18 communicates with the interior of the casing above the plate 3. A waste pipe 19 extends through the bottom of the casing 1 through the plate 3 and through the bottom of the tray 6, and may be fitted with a suitable plug whenever it is required to use the tray 6 as a hot water sink for washing dishes.

In use, the tray 6 may be kept warm for heating dishes for the table by opening the valve 12 and permitting steam to pass through the pipe 8 into the heater 9. The pipe 8 may be connected to the hot water supply from the locomotive. Whenever hot water is required, the water of condensation in the compartment 15 may be drawn off through the spigot 17. When it is desired to use the tray 6 as a dish washer, a plug may be inserted in the waste pipe within the tray and hot water may be placed in the tray for washing the dishes.

From the foregoing it will be obvious that a device made in accordance with my invention takes but little room, is very convenient in furnishing hot water, keeping dishes warm, and in washing dishes, under conditions where economy of space is a consideration.

Having thus described the invention, what I claim is:

In a device of the character described, the combination of an outer casing, a perforated plate disposed above the bottom of the casing and resting on supports, a tray above the plate within the casing, said tray resting upon supports secured to the perforated plate, a steam heater disposed below the perforated plate and having a perforated top, a hot water pipe connected to the lower portion of the casing, and a waste pipe extending through the bottom of the casing, through the plate and through the bottom of the tray, substantially as described.

In testimony whereof, I affix my signature in presence of two witnesses.

R. L. WASHINGTON.

Witnesses:
J. H. EDWARDS,
E. E. STEWART.